(12) United States Patent
Bogdahn et al.

(10) Patent No.: US 7,600,399 B2
(45) Date of Patent: Oct. 13, 2009

(54) METHOD AND DEVICE FOR PRODUCING A CYLINDRICAL GLASS BODY

(75) Inventors: Thomas Bogdahn, Karlstein (DE); Oliver Ganz, Bruchköbel (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 513 days.

(21) Appl. No.: 10/502,500

(22) PCT Filed: Jan. 23, 2002

(86) PCT No.: PCT/EP02/00664

§ 371 (c)(1),
(2), (4) Date: Jul. 23, 2004

(87) PCT Pub. No.: WO03/022757

PCT Pub. Date: Mar. 20, 2003

(65) Prior Publication Data

US 2005/0076675 A1    Apr. 14, 2005

(51) Int. Cl.
*C03B 37/07* (2006.01)
*C03B 37/025* (2006.01)
*C03B 37/02* (2006.01)

(52) U.S. Cl. ............................ 65/381; 65/377; 65/435; 65/475; 65/477; 65/29.12; 65/160

(58) Field of Classification Search ........................ None
See application file for complete search history.

(56) References Cited

U.S. PATENT DOCUMENTS 3,652,248 A    3/1972 Loxley et al.

(Continued)

FOREIGN PATENT DOCUMENTS

DE    195 36 960 A    3/1996

(Continued)

OTHER PUBLICATIONS

Machine Translation of Boscher, D. et. al (FR 2,767,810) Accessed from translate.google.com (http://translate.google.com/translate?u=http%3A%2F%2Fv3.espacenet.com%2Ftextdes%3FDB%3DEPODOC%26IDX%3DFR2767810%26F%3D0%26QPN%3DFR2767810&langpair=fr%7Cen&hl=en&ie=UTF8) on Jun. 13, 2007.*

(Continued)

*Primary Examiner*—Steven P. Griffin
*Assistant Examiner*—Jason L. Lazorcik
(74) *Attorney, Agent, or Firm*—Tiajoloff and Kelly LLP

(57) ABSTRACT

In a known method for producing a cylindrical glass body in a vertical drawing process, a glass blank is softened in a heating zone and drawn off as a glass strand by means of a draw-off device at a controlled drawing speed, the draw-off device comprising a first draw-off unit with rolling bodies rolling on the glass strand and being distributed around the circumference thereof, the rolling bodies being formed by a reference rolling body and at least one auxiliary rolling body, the drawing speed being controlled via the speed of the reference rolling body. Starting therefrom, in order to reduce damage to the surface of the glass strand caused by the draw-off device and to avoid deformations caused by existing bends of the glass strand, it is suggested according to the invention that a value for the torque of the reference rolling body (3) should be determined in dependence upon the weight of the drawn-off glass strand (5), and that the determined value should be used as a setpoint torque for setting the torque in the at least one auxiliary rolling body (4; 7; 8).

16 Claims, 2 Drawing Sheets

U.S. PATENT DOCUMENTS

Figure 1:
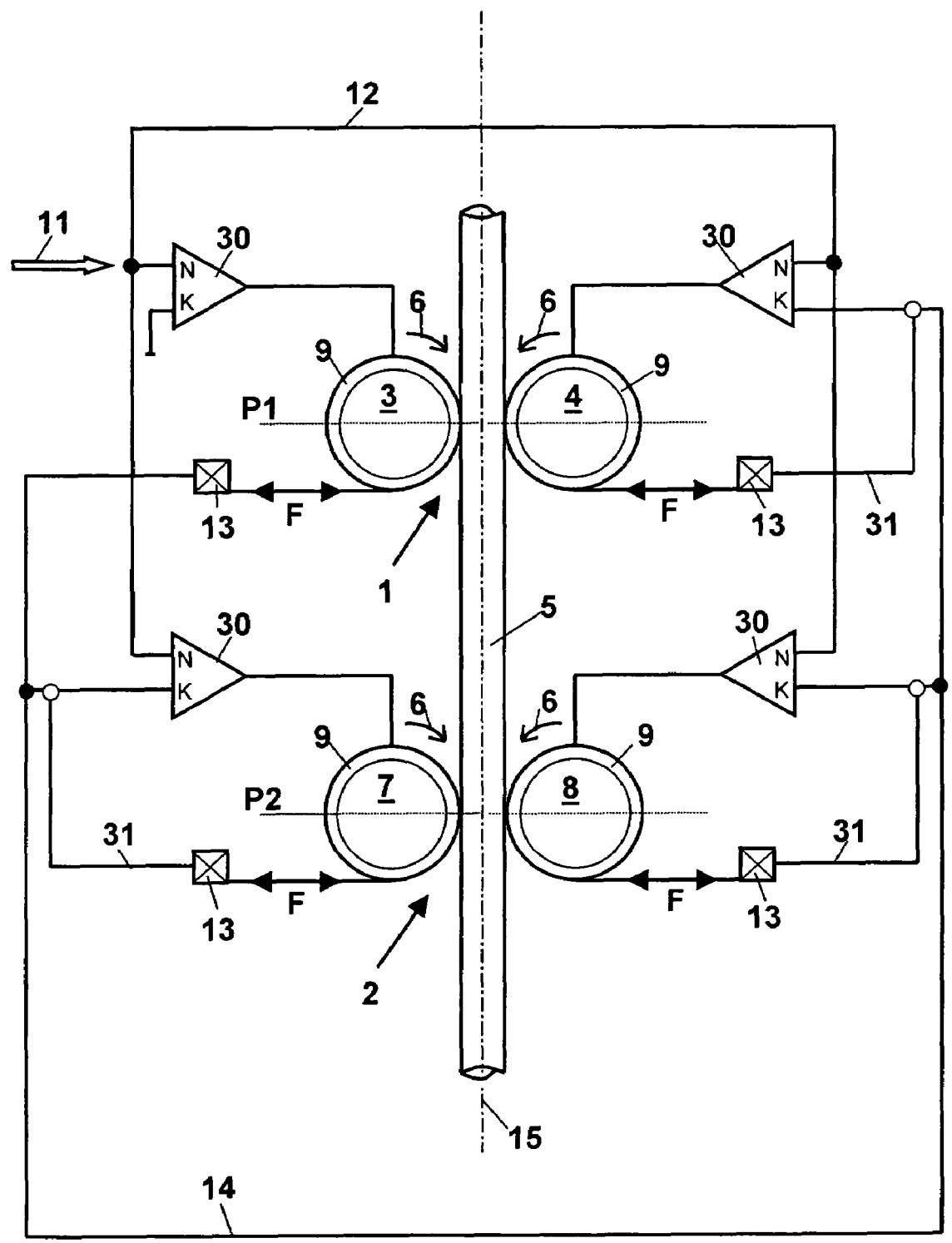

| | | | |
|---|---|---|---|
| 6,098,428 | A | 8/2000 | Bogdahn et al. |
| 6,178,778 | B1 | 1/2001 | Kenmochi et al. |

FOREIGN PATENT DOCUMENTS

| | | | | |
|---|---|---|---|---|
| EP | 0 846 665 | A | | 6/1998 |
| EP | 1 092 685 | A | | 4/2001 |
| FR | 2 767 810 | A | | 3/1999 |
| FR | 2767810 | A1 | * | 3/1999 |

OTHER PUBLICATIONS

"NIST Property Data Sheet: Sintered Silicon Carbide (SiC)", Accessed from (http://www.ceramics.nist.gov/srd/summary/scdscs.htm) on Jun. 13, 2007.*

Haldenwanger company Halsic ceramic roller product catalog (English language equivalent) Accessed from (http://www.haldenwanger.de/pdf/fused.pdf) on Jun. 13, 2007.*

HaldenWanger company Halsic ceramic roller product catalog (German) Accessed from (http://web.archive.org/web/20001118093500/www.haldenwanger.de/index2.cfm?rubrik=Halsic-R/Halsic-I) on Jun. 13, 2007.*

English Language translation of Boscher et al. (FR 2,767,810).*

* cited by examiner

METHOD AND DEVICE FOR PRODUCING A CYLINDRICAL GLASS BODY

The present invention relates to a method and an apparatus for producing a cylindrical glass body, in particular a quartz glass body, in a vertical drawing process, comprising a method step in which a glass blank is supplied to a heating zone, softened therein zonewise and a glass strand is drawn off by means of a draw-off device at a controlled drawing speed from the softened area, the draw-off device comprising a first draw-off unit with rolling bodies rolling on the glass strand and being distributed around the circumference thereof, the rolling bodies being formed by a reference rolling body and at least one auxiliary rolling body, the drawing speed being controlled via the speed of the reference rolling body.

Furthermore, the invention relates to an apparatus for producing a cylindrical glass body, in particular a quartz glass body, in a vertical drawing process, comprising an annular heating element for heating and softening a glass blank, comprising a draw-off device including a frame which holds thereon a first draw-off unit with rolling bodies rolling on the glass strand and being distributed around the circumference thereof, the rolling bodies being formed by a reference rolling body and at least one auxiliary rolling body, the reference rolling body being connected to a speed control for setting the drawing speed.

Such methods and apparatuses serve to produce cylindrical components, in particular tubes and rods of quartz glass, or preforms for optical fibers. DE-A 195 36 960 describes a method and an apparatus of said type. For producing a quartz glass tube in a vertical drawing process a hollow cylinder of quartz glass is supplied, starting with the lower end, to an annular furnace and is heated therein and softened zonewise. A quartz glass tube strand is continuously drawn off downwards from the softened area under formation of a drawing bulb. To this end there is provided in a vertically fixed position a draw-off device comprising two rolls rolling on the drawn-off tube strand in opposing fashion and opposite directions.

The outer diameter and the wall thickness of the tube strand are set to a predetermined setpoint value. The manipulated variable for said control are drawing speed and blowing pressure, the drawing speed being adjusted by controlling the rotational speed of the rolls. Tube pieces are separated from the drawn-off tube strand with the desired length from time to time.

Since the quartz glass in the area of the draw-off device has not cooled completely, the rolls might create impressions. In particular with bends of the glass strand, high forces might act on the glass strand and produce a further deformation of the strand due to the lever action in the area of the drawing bulb. Moreover, due to the irregular wear of the opposite rolls, path or gearing differences are created, resulting in stress marks and other surface injuries. Sudden changes in the weight of the glass strand during cutting to length may also contribute to injuries to the surface in the area of the draw-off device.

It is the object of the present invention to provide a method which reduces damage to the surface of the glass strand caused by the draw-off device and in the case of which deformations caused by existing bends of the glass strand are avoided. Furthermore, it is the object of the present invention to provide an apparatus which makes it possible to produce cylindrical quartz glass bodies in a vertical drawing process substantially without any damage to the surface.

This object is achieved according to the invention with respect to the method, starting from the method of the above-mentioned type, in that a value for the torque of the reference rolling body is determined in dependence upon the weight of the drawn-off glass strand, and that the determined value is used as a setpoint torque for setting the torque in the at least one auxiliary rolling body.

In the simplest case the rolling bodies are rolls (rollers) having a roll surface in the form of a cylinder jacket. Several rolling bodies are distributed around the glass strand in such a way that the contact pressure forces exerted by the rolling bodies in radial direction on the glass strand mutually compensate one another. In the simplest case, but not necessarily, the rolling bodies of a first draw-off unit rest in a joint horizontal plane on the glass strand.

In at least one of the rolling bodies, the rotational speed and thus the drawing speed of the draw-off device is controlled. In the following explanations, said rolling body of the first draw-off unit is designated as a "reference rolling body" or also as a "reference roll". Due to the diameter of the reference roll and its coefficient of friction in contact with the glass strand, a specific torque is obtained for the reference roll at the set speed and in dependence upon the weight of the drawn-off glass strand.

The torque "D" of a rotatably supported body is defined as the product of force "K" and lever arm "I".

$$D = K \times I$$

In the present vertical drawing process, force "K" follows from the weight of the drawn-off glass strand in combination with the static friction of the rolling body in contact with the glass strand. The static friction is influenced by the circumferential speed of the rolling body rolling on the glass strand.

In the method according to the invention, the torque of the reference roll, or a value which can be correlated with said torque, is determined, and the determined value is used as a "setpoint torque" for predetermining the setting of the torque of the remaining rolling bodies of the first draw-off unit. The torques thereof are thus coordinated with reference to the predetermined setpoint torque. The torques of the auxiliary rolling body or the auxiliary rolling bodies may differ from the torque of the reference rolling body for many reasons. Examples to be given here are different speeds and outer diameters or non-circularity or out-of-roundness of the rolling bodies. One reason for different outer diameters and non-circularity may be wear.

The value of the torque of the reference roll can be determined by way of measurements or also by way of calculations. In the simplest case, the value is directly measured on the reference roll. So-called "strain gage sensors", or measuring devices equipped therewith, such as torque metering shafts, are suited therefor. The torque is set on the basis of the actually operating weight of the drawn-off glass strand in such a way that the exact weight need not be known. However, the torque or the change thereof in time can also be calculated on the basis of the concrete conditions of the technical process and apparatus, such as the actual outer diameter of the reference roll, the frictional resistance during rolling and the weight of the drawn-off glass strand (or the volume thereof).

Since the torques are coordinated during rolling of the rolling bodies of the first draw-off unit on the basis of the torque of the reference roll, it is ensured that the rolling bodies of the draw-off unit have the same or similar circumferential speeds. is Ideally, all of the rolling bodies of the draw-off unit exert the same forces on the glass strand. Gearing differences between the rolling bodies, and injuries caused thereby on the surface of the glass strand are thereby avoided.

Both the determination of the setpoint torque and the adjustment of the torque of the auxiliary rolling bodies on the basis of the setpoint torque are carried out during the drawing process repeatedly, preferably continuously. Changes in the setpoint torque, e.g. because of changes in weight of the glass strand or non-circularity of the reference roll, are thus considered permanently, and gearing differences caused thereby between the rolling bodies can be avoided. Ideally, the torque of the auxiliary rolling body or bodies corresponds exactly to the torque of the reference roll. The setpoint torque of the reference roll is determined anew in a permanent way (repeatedly, preferably continuously). This results in a variable setpoint torque as a predetermined value for the at least one auxiliary rolling body. Preferably, the torque of the at least one auxiliary rolling body is adjusted to this variable setpoint torque.

It has been found to be of advantage when a draw-off device is used that comprises at least one second draw-off unit including a plurality of rolling bodies.

When viewed in the direction of the longitudinal axis of the glass strand, the second draw-off unit is positioned above or below the first draw-off unit. A plurality of axially spaced-apart draw-off units may be used. Here and in the following text, "second draw-off unit" means every further—second, third, fourth, etc.—draw-off unit. The rolling bodies of the second draw-off unit are arranged one above the other or are offset relative to one another, when viewed in axial direction.

The second draw-off unit comprises at least two rolling bodies. The number, geometry or arrangement of the rolling bodies of the first and second draw-off unit need not be identical. Moreover, as for the geometry and arrangement of the rolling bodies of the second and any further draw-off unit on the glass strand, the observations made above on the rolling bodies of the first draw-off unit apply by analogy.

The use of several draw-off units that are axially distributed on the glass strand permits a more uniform distribution of the forces needed for holding and guiding the glass strand, and thus a reduction of the contact pressure force of the individual rolling bodies. Damage to the surface is thereby avoided or reduced.

In this respect it has been found to be of particular advantage when the rolling bodies of the at least one second draw-off unit are movable in a direction perpendicular to the longitudinal axis of the glass strand. Hence, these rolling bodies are characterized in that their "radial position" (viewed in a direction perpendicular to the longitudinal axis of the glass strand) is not fixed but is variable during the drawing process. Hence, in the case of a bent glass strand, the rolling bodies can be adjusted in radial direction to follow the bend. This prevents a situation where forces arise that do not act in a direction perpendicular to the longitudinal axis of the glass strand. Otherwise, such forces would have an impact—due to lever action—on the area of the softened zone, resulting in an additional deterioration of the dimensional accuracy of the glass strand. The radial adjustment is e.g. achieved by adjusting (positioning) the rolling bodies by a motor on the glass strand and in a particularly advantageous way by means of a "float cushion" which permits a radial sliding movement of the rolling bodies (or the mountings thereof) almost without any frictional resistance.

A further improvement is achieved due to the fact that the rolling bodies of the at least one second draw-off unit are used as auxiliary rolling bodies in the case of which the torque is set on the basis of the torque of the reference rolling body. It is not only the torque of the auxiliary rolling body of the first draw-off unit that is here coordinated, but also the torque of the rolling bodies of the second (or also any further) draw-off unit. The setpoint torque follows for all auxiliary rolling bodies in engagement with the glass strand from the value for the torque of the reference roll, as has been described above in more detail for the at least one auxiliary rolling body of the first draw-off unit. The torque of the auxiliary rolling body is set to the setpoint torque or adjusted on the basis thereof. Thanks to the many rolling bodies that are in engagement with the glass strand, it is possible, on the one hand, to distribute more evenly the force required for holding and guiding the glass strand, and thus to keep the contact pressure force small that is acting locally through each of the individual rolling bodies, and, on the other hand, to reduce or prevent gearing differences between the individual rolling bodies by coordinating the torques. In a particularly preferred case, the torque for each rolling body in engagement with the glass strand is controlled separately.

It has been found to be particularly useful when the rolling bodies press against the glass strand with an adjustable contact pressure force. The contact pressure force can be set individually for each of the rolling bodies, or to the same value for all rolling bodies of a draw-off unit, or to the same value for all rolling bodies of the draw-off device on the whole. The setting operation is carried out by way of control or regulation. The contact pressure forces can be distributed in a selective way over the individual rolling bodies by a controlled or regulated adjustment, and locally high contact pressure forces can thereby be avoided. The forward movement of the rolling bodies for producing the contact pressure force may take place hydraulically, pneumatically or by way of a motor.

It has turned out to be of particular advantage when the contact pressure force is set in dependence upon the weight of the drawn-off glass strand. The vertically downwardly acting weight is reduced by means of the contact pressure force of the rolling bodies and the static friction produced thereby. A certain static friction below which there would be a slipping through of the glass strand must be observed. The weight of the glass strand increases continuously until separation of the piece with the desired length. Therefore, in the simplest case, the rolling bodies are pressed from the beginning against the glass strand with a contact pressure force that is sufficient to reduce the maximum weight to be expected. As an alternative, the contact pressure force is increased continuously or incrementally with an increasing weight. Damage to the surface can be further minimized by the last-mentioned variant of the method.

In this respect it has turned out to be of particular advantage when, in case a predetermined maximum contact pressure force is exceeded in the rolling bodies of the first draw-off unit, the rolling bodies of the second draw-off unit are additionally brought into in engagement with the glass strand or, as an alternative thereto, when the contact pressure force is increased when rolling bodies of the second draw-off unit are already in engagement with the glass strand. In this process a maximally admissible value (hereinafter called "maximum value") is predetermined for the contact pressure force of a rolling body. The static friction to be applied for reducing the weight is first produced (at a small weight) with a small number of the rolling bodies of the first draw-off unit. These are either pressed from the beginning with a predetermined contact pressure force ($\leq$maximum value) against the glass strand or the contact pressure force is increased with an increasing weight of the glass strand. As soon as the static friction to be applied by the rolling bodies of the first draw-off unit is no longer sufficient for reducing the weight of the glass strand, either further rolling bodies are brought into engagement with the glass strand, which will then intercept part of the weight of the glass strand also by their contact pressure force and the static friction produced thereby, or the contact pressure force is increased in rolling bodies which are already in engagement with the glass strand, but with a contact pressure force below the predetermined maximum value. As soon as the additional static friction has been provided by rolling bodies of the second (and any further) draw-off unit, the contact pressure force of the rolling bodies of the first draw-off unit can be reduced again. Ideally, all of the rolling bodies in engagement with the glass strand are provided with the same contact pressure force, the latter being set to be just so high that in combination with the glass strand it produces a static friction which just prevents a slipping through of the glass strand at the respective weight.

A further improvement is achieved in that the control of the contact pressure force comprises a damping member. The damping member has a smaller spring constant than the mechanism of the draw-off device so that it dampens the natural vibrations thereof. This prevents overshooting, which turns out to be of particular advantage to the control of the contact pressure force, in particular in the case of fast changes in weight, e.g. during separation of a glass strand piece. The damping member in a preferred embodiment of the invention is designed as a mechanical spring element, e.g. as a torsion spring.

The static friction needed for reducing the weight of the glass strand is produced by pressing the rolling bodies against the strand. Preferably, rolling bodies are used with a roll surface having a coefficient of friction in the range of from 0.2 to 0.5. In the case of a roll surface having a high coefficient of friction, a small contact pressure force is sufficient for producing an adequate static friction. However, a high coefficient of friction normally leads to a roll surface with a pronounced surface structure, which may lead to injuries to the glass strand. This drawback is avoided by a roll surface having a low coefficient of friction. However, a high contact pressure force is then required for producing a sufficient static friction, which may also lead to injuries to the glass strand. In this respect a roll surface having a coefficient of friction in the above-mentioned range turns out to be a suitable compromise.

Materials that contain asbestos, asbestos substitutes or SiC have turned out to be particularly suited as materials for the roll surface. The rolling bodies consist of the said materials or they are coated therewith in the area of their roll surface. The said materials can also be applied to a carrier, e.g. to a grid, grating, woven fabric, knitted fabric, or the like, of metal of graphite. Apart from a high wear resistance, a high heat resistance is essential. Calcium silicate and aluminum silicate should here be mentioned as examples of asbestos substitutes.

As for the apparatus, the above-mentioned object is achieved according to the invention, starting from an apparatus of the above-mentioned type, on the one hand, in that a means is provided for determining the torque during rolling of the reference rolling body and a means for setting the torque in the at least one auxiliary rolling body to a setpoint torque.

As for the design and arrangement of the rolling bodies and the definitions of the terms "reference rolling body" and "auxiliary rolling body", which are also used in the following, reference is made to the above explanations regarding the method of the invention.

The apparatus according to the invention is characterized in that a means is provided for determining the torque during rolling of the reference rolling body and a means for setting the torque in the at least one auxiliary rolling body. With the help of the means for determining the torque, the torque of the reference roll, or a value which can be correlated with said torque, is determined and the determined value is used as a measure of the torque of the remaining rolling bodies of the first draw-off unit.

The value of the torque of the reference roll can be determined by way of measurements or also by way of calculations. In the first-mentioned case a measuring device is provided for measuring the torque acting on the reference roll. So-called "strain-gage sensors", or measuring devices equipped therewith, such as torque metering shafts, are e.g. suited therefor. The force which acts on the reference roll in the direction of the drawn-off glass strand and which follows in dependence upon the actual weight of the drawn-off glass strand is sensed with the help of the measuring device.

The torque during rolling of the rolling bodies of the first draw-off unit is coordinated on the basis of the torque of the reference roll. To this end a means is provided for setting the torque in the at least one auxiliary rolling body to the setpoint torque. The means for setting the torque comprises, for instance, a drive for the rolling movement of the respective rolling body which is connected to a speed controller with correction input, and a measuring device for measuring the torque acting on the respective rolling body. In setting the speed during rolling, such a means permits a controlled adjustment of the actual torque to a setpoint torque derived from the torque of the reference roll.

The torque of the auxiliary rolling body or bodies is set during the drawing process repeatedly or continuously. Preferably the setpoint torque should be set continuously to the value of the torque of the reference rolling body. Changes in the torque of the reference rolling body, e.g. because of changes in weight of the glass strand or by reason of wear in the reference rolling body, are taken into account by a corresponding adaptation of the setpoint torque. It is thereby ensured that the rolling bodies of the draw-off unit have always the same or similar circumferential speeds, and that gearing differences between the rolling bodies are avoided.

Preference is given to an embodiment of the apparatus according to the invention, wherein the draw-off device comprises at least a second draw-off unit including a plurality of rolling bodies. When viewed in the direction of the longitudinal axis of the glass strand, the second draw-off unit is arranged above or below the first draw-off unit. A plurality of axially spaced-apart draw-off units may be used. "Second draw-off unit" means here and in the following any further—second, third, fourth, etc.—draw-off unit.

The second draw-off unit comprises at least two rolling bodies. Number, geometry or arrangement of the rolling bodies of first and second draw-off unit need not be identical. As for the geometry and arrangement of the rolling bodies of the second and any further draw-off unit on the glass strand, the observations made above on the rolling bodies of the first draw-off unit apply by analogy.

The at least one second draw-off unit is preferably held in the same frame as the first-draw-off unit, the rolling bodies of the second draw-of unit being movably supported on the frame in a direction perpendicular to the longitudinal axis of the glass strand. These rolling bodies are thus characterized in that their "radial position" (viewed in a direction perpendicular to the longitudinal axis of the glass strand) is not fixed, but is variable, during the drawing process. Thus, in the case of a bent glass strand, the rolling bodies can be adjusted in radial direction to follow the bend. This avoids the generation of forces that do not act in a direction perpendicular to the longitudinal axis of the glass strand. The radial adjustment is e.g. achieved by a motor-type drive, a hydraulic drive or a pneumatic drive. A "float cushion" which permits a radial sliding movement of the rolling bodies (or the mounting thereof) in the manner of an air cushion almost without any frictional resistance is used therefor in a particularly advantageous manner.

A further improvement is achieved by connecting the rolling bodies of the second draw-off unit to a means for setting the torque. The rolling bodies of the second draw-off unit can thus also be operated as "auxiliary rolling bodies" in the sense of this invention. This means that the torque thereof can be set with the help of the respective means for setting the torque. The setpoint torque follows for all of the auxiliary rolling bodies from the value for the torque of the reference roll. On the one hand, it is possible with the rolling bodies of the second (and further) draw-off unit to distribute the force needed for holding and guiding the glass strand over the contact pressure forces of a plurality of rolling bodies that are in engagement with the glass strand, i.e. to keep small the contact pressure force that is locally acting through each of the individual rolling bodies and, on the other hand, to reduce or avoid gearing differences between the individual rolling bodies by coordinating the torques. Ideally, a separate means for setting the torque is provided for each rolling body in engagement with the glass strand.

In a particularly preferred embodiment of the apparatus according to the invention, there is provided a contact pressure force control unit by means of which the rolling bodies are pressed with an adjustable contact pressure force against the glass strand. The contact pressure force can be individually set for each of the rolling bodies, or to the same value for all rolling bodies of a draw-off unit, or to the same value for all rolling bodies of the draw-off device on the whole.

The contact pressure force is set in a controlled way by the contact pressure force control unit. Thanks to the controlled adjustment, the contact pressure forces can be distributed in a selective way over the individual rolling bodies, and locally high contact pressure forces are thus avoided. Moreover, the contact pressure force can be set in dependence upon the weight of the drawn-off glass strand. Reference is here made to the above explanations regarding the method of the invention.

It has turned out to be of particular advantage when the contact pressure control unit comprises a damping member. The damping member has a smaller spring constant than the mechanism of the draw-off device, so that it dampens the natural vibrations thereof. In a preferred embodiment of the invention, the damping member is designed as a mechanical spring element, e.g. as a torsion spring.

A pivot device by means of which the frame is pivotable about a tilt angle relative to the vertical has turned out to be particularly useful. In case the center axis of the drawn-off glass strand deviates from the vertical, the draw-off device, including the respective draw-off units, can be tilted by means of the pivot device by the corresponding angle with respect to the vertical.

Furthermore, the above-indicated object is achieved according to the invention with respect to the apparatus, starting from an apparatus of the above-mentioned type, in that the rolling bodies are provided with a roll surface having a coefficient of friction in the range of 0.2 to 0.5.

As for the design and arrangement of the rolling bodies and the definitions of the terms "reference rolling body" and "auxiliary rolling body" as used hereinafter, reference is made to the above explanations regarding the method according to the invention.

The apparatus according to the invention is characterized by rolling bodies having a roll surface with a coefficient of friction in the range of 0.2 to 0.5 . In the case of a roll surface having a high coefficient of friction, a small contact pressure force is sufficient for producing a sufficient static friction. However, a high coefficient of friction normally requires a roll surface with a pronounced surface structure, which might lead to injuries to the glass strand. Said drawback is avoided by a roll surface having a low coefficient of friction. However, this will then require a high contact pressure force for generating a sufficient static friction, which might also lead to injuries to the glass strand. In this respect a rolling body having a roll surface with a coefficient of friction in the above-mentioned range turns out to be a suitable compromise.

Materials that contain asbestos, asbestos substitutes or SiC have turned out to be particularly suited as materials for the roll surface. The rolling bodies consist of the said materials or are coated therewith in the area of their roll surface. The said materials may also be applied to a carrier, e.g. to a grid, grating, woven fabric, knitted fabric, or the like, of metal or graphite. Apart from a high wear resistance, a high heat resistance is essential. Calcium silicate and aluminum silicate should here be mentioned as examples of asbestos substitutes.

The present invention shall now be explained in more detail with reference to embodiments and a patent drawing, which shows in detail in FIG. 1 a diagram for controlling the torque of a draw-off device for performing the vertical drawing method according to the invention; and FIG. 2 a diagram for controlling the contact pressure force in said method.

FIG. 1 is a diagram showing a draw-off device for drawing a quartz glass strand 5 having a vertically oriented longitudinal axis 15, the draw-off device comprising an upper draw-off unit 1 and a lower draw-off unit 2. The upper draw-off unit 1 comprises two draw-off rolls 3; 4 which are arranged in opposite relationship in a fixed horizontal position P1 on a quartz glass strand 5 and roll on said strand in an opposite rotational direction 6. Equally, the lower draw-off unit 2 comprises two draw-off rolls 7; 8 acting in opposite relationship in the fixed horizontal position P2 on the quartz glass strand 5, with a distance of 55 cm being set between P1 and P2. The respectively opposite draw-off rolls 3; 4 and 7; 8 are pressed with a predetermined contact pressure force against the quartz glass strand 5, the contact pressure forces mutually compensating each other.

The draw-off rolls 3; 4; 7; 8 are rolls having an initial nominal outer diameter of 215 mm and a width of 100 mm, which consist of aluminum and whose cylindrical outer roll surface 9 is formed by a coating of calcium silicate. The coefficient of friction of the roll surface on the quartz glass strand 5 is about 0.36.

The method according to the invention for setting the torque of the draw-off rolls 3; 4; 7; 8 during rolling on the quartz glass strand 5 shall now be described in more detail with reference to the diagram shown in FIG. 1.

The draw-off roll 3 as the only speed-controlled draw-off roll of the draw-off device forms the "reference roll" for the draw-off control. With the speed control, a nominal value N for the setpoint speed is predetermined for the draw-off roll 3, as shown by the input arrow 11. The nominal value N follows from the necessary drawing speed, which is the manipulated variable of the control for the outer diameter of the quartz glass strand 5. In the embodiment a nominal value N for the speed of the reference roll of 5.9 rpm is obtained in the case of a quartz glass strand of 90.1 mm.

Each of the draw-off rolls 3; 4; 7; 8 is connected to a separate speed controller 30. The nominal value N for the desired speed of the reference roll 3 is supplied via the connection line 12 to an input of the speed controller 30. A correction signal K which follows from a measurement of the torque of the reference roll 3 and the respective torque of the draw-off roll 4; 7; 8 is supplied to the second input via connection line 14.

A strain gage sensor (bending bar) 13 is provided for measuring the torque of the reference roll (schematically illustrated by the double-headed arrow F). The torque F acting on the reference roll 3 follows from the actual weight of the quartz glass strand 5 in combination with the static friction and the outer diameter of the reference roll 3. The value measured for torque F serves as a "setpoint torque" for the remaining draw-off rolls 4; 7; 8 of the draw-off device, thereby making a first contribution to said correction signal K.

A second contribution to the correction signal K follows from the measured values of the torques of the remaining draw-off rolls 4; 7; 8. To this end a strain gage sensor 33 is provided on each of the draw-off rolls 4; 7; 8. Torque F is also observed on the draw-off rolls 4; 7; 8 due to the actual weight of the quartz glass strand 5 in combination with the static friction and the outer diameter of the respective draw-off roll 4; 7; 8.

A comparison between the first and second contribution yields the correction signal K which is used for readjusting the torques F on the draw-off rolls 4; 7; 8. To this end a separate control path 31 is provided for each draw-off roll 4; 7; 8 for adjusting the respective torque F to the predetermined setpoint torque.

The above-described combination of speed and torque control guarantees that all of the draw-off rolls 3; 4; 7; 8 of the draw-off device have the same circumferential speeds. Changes in the setpoint torque (in the case of reference roll 3), e.g. due to changes in weight of the glass strand 5, are immediately sensed and taken into account in the remaining draw-off rolls 4; 7; 8. Also taken into account are changes in the draw-off rolls 4; 7; 8 that lead to a change in the respective torque F, e.g. a reduction of the outer diameter, in that the torque F of the draw-off rolls 4; 7; 8 is readjusted accordingly.

Injuries to the surface of the quartz glass strand 5 that are caused by gearing differences between the draw-off rolls 3; 4; 7; 8 are thereby avoided.

In addition, the contact pressure force with which the draw-off rolls 3; 4; 7; 8 press against the quartz glass strand 5 are monitored and controlled continuously. The control shall now be described in more detail with reference to the example shown in FIG. 2.

Figure 2:
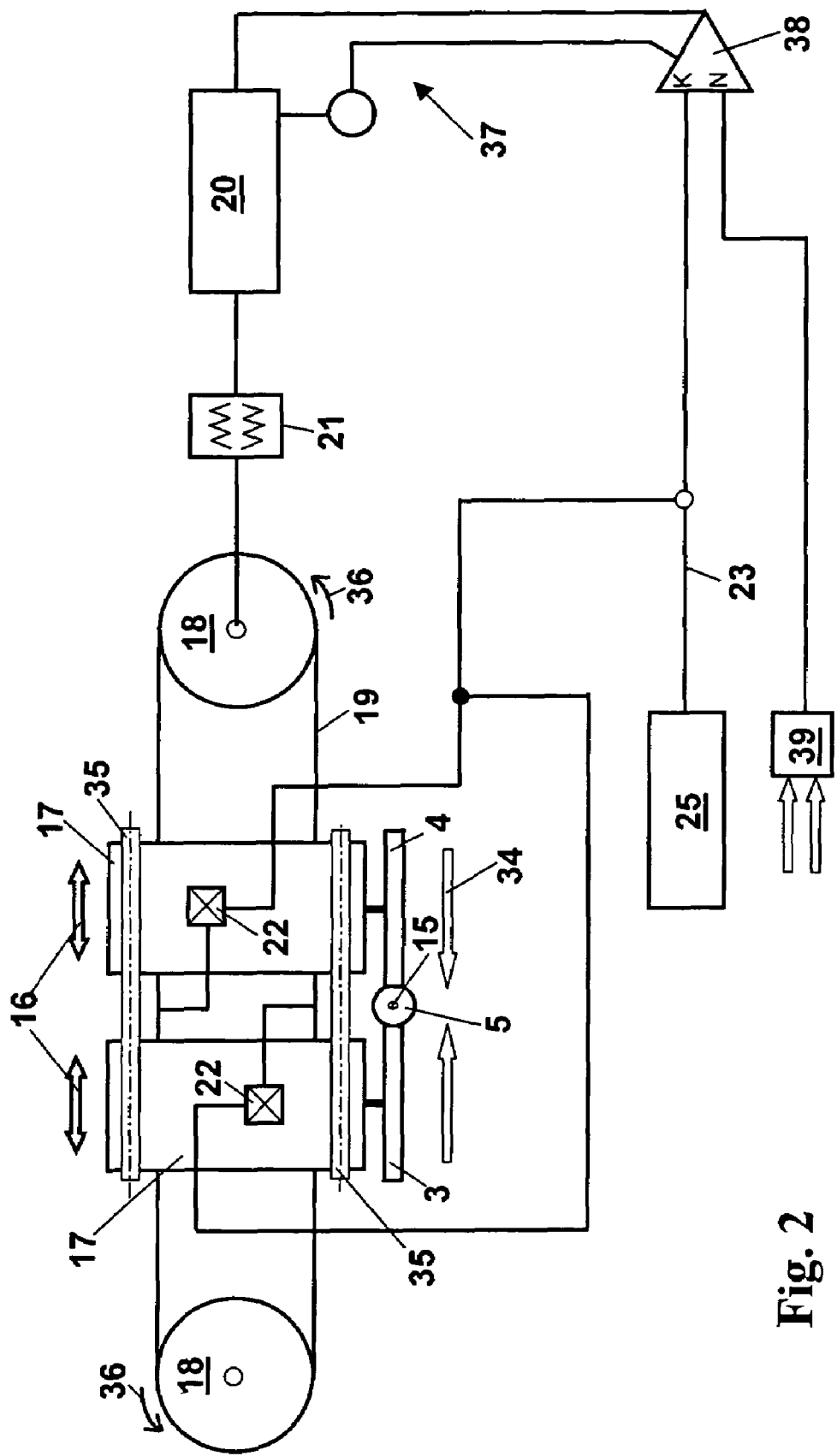

FIG. 2 shows the control unit for controlling the contact pressure force with reference to the pair of rolls of the upper draw-off unit 1. The draw-off rolls 3; 4 are pressed against the quartz glass strand 5 with an adjustable force, which is symbolized by directional arrows 34 and ranges between 10 and 65 kp, by the draw-off rolls 3; 4 being reciprocated in a direction perpendicular to the longitudinal axis 15 of the quartz glass strand 5, which extends here in a direction perpendicular to the plane of the diagram, as shown by the directional arrows 16. To this end each of the draw-off rolls 3; 4 is secured to a carrier 17. Carriers 17 are slidably supported on a slide bearing 35, the carriers being movable towards or away from each other in their horizontal plane by means of a belt 19 running around two rollers 18. In the embodiment, the rotation of rollers 18 in the direction illustrated by the directional arrow 36 has the effect that the carriers 17 and thus the draw-off rolls 3; 4 are moved towards each other. The rollers 18 are rotated by a motor 20. A torsion spring 21 is provided between the motor 20 and the rollers 18.

A static friction which is sufficient for intercepting the weight of the quartz glass strand 5 is produced by the contact pressure force 34 of the draw-off roll 3; 4. A minimum static friction below which the quartz glass strand 5 would slip through must be observed. On the other hand a contact pressure force 34 that is as small as possible is desired for avoiding damage to the strand surface. The contact pressure force 34 is therefore set to be so high that it generates—in connection with the quartz glass strand 5—a static friction which reliably prevents the quartz glass strand 5 from slipping through, but does not exceed a predetermined maximum value (65 kp). The maximum value is fed by means of a computer 25 into a control circuit 37.

The draw-off rolls 3; 4 are pressed with an initial contact pressure force 34 of 10 kp against the quartz glass strand 5. As the weight of the quartz glass strand 5 is rising until a piece is cut off with the desired length, the contact pressure force 14 increases continuously. For this purpose the actual weight of the quartz glass strand 5 is calculated by means of a computer 25. The contact pressure force 34 is permanently measured by means of load cells 2 and the mean value of said measured values is compared with a desired value (line 23) determined by the computer 25, which takes into account the actual weight of the drawn-off quartz glass strand 5. The resulting comparative value is supplied to a controller 38 of the control circuit 37 as a correction value K which regulates the motor 20. Depending on the weight of the quartz glass strand 5, the contact pressure force 34 is increased—as long as it is smaller than the predetermined maximum force—or reduced.

The torsion spring 21 has a smaller spring constant than the mechanism of the draw-off device. Therefore, it prevents an overshooting of the control, in particular in the case of sudden changes in the control parameters, e.g. when the quartz glass strand 5 is cut to length.

The signal for opening or closing the draw-off rolls 3; 4 is predetermined by a stored-program control (SPC) 39 via which the nominal value for the contact pressure force is also predetermined.

In a variant of the method (not shown), the contact pressure force required for holding the quartz glass strand is evenly distributed in a computer-controlled way (computer 25) over the draw-off rolls 3, 4; 7; 8 of the two draw-off units 1; 2. To this end the lower draw-off unit 2 is provided with a corresponding measurement, control and movement means, as is shown for the upper draw-off unit 1 in FIG. 2. The draw-off rolls 7; 8 of the lower draw-off unit 2 will here only be brought into engagement with the quartz glass strand 5 if the contact pressure force 34 of the draw-off roll 3; 4 exceeds the maximum contact pressure force of 65 kp or if for other reasons a uniform distribution of the necessary contact pressure force over several draw-off rolls makes sense. As soon as the additional static friction is provided by the draw-off rolls 7;8, the contact pressure force of the draw-off rolls 3; 4 is again lowered in a computer-controlled manner (computer 25) to such a level that all of the draw-off rolls 3; 4; 7; 8 produce the same contact pressure force 14. The contact pressure force of the draw-off rolls 7; 8 is also regulated, a control unit being here used as shown in FIG. 2.

Moreover, the draw-off rolls 7;8 of the lower draw-off unit are also displaceable on the whole in a direction perpendicular to the longitudinal axis 15 of the quartz glass strand 5, namely by the means including carriers 17, rollers 18, belt 19 and motor 20. Hence, the "radial position" of the draw-off rolls 7; 8 is variable. As a consequence, in the case of an arising bending of the quartz glass strand 5, said draw-off rolls 7;8 can follow said bending and can be adjusted in radial direction in a computer-controlled manner. Alternatively, a "float cushion" is used for the radial adjustment, the cushion permitting a radial sliding movement of the draw-off rolls 7; 8 almost without any frictional resistance. Such a purely mechanical adjustment can be realized at less costs than a computer-controlled adjustment and is therefore particularly suited for draw-off rolls of a third plane.

The roll surfaces 9 of the draw-off rolls 3; 4; 7; 8 are formed by a coating of calcium silicate. This is a substitute for asbestos which is characterized by a high temperature resistance and high coefficients of friction. In connection with a quartz glass strand, coefficients of friction around 0.36 are measured. For extending the service life the draw-off rolls 3, 4; 7; 8 are cooled in addition. Cooling is carried out in that the surface of the quartz glass strand 5 above the draw-off rolls 3; 4; 7; 8 is blown at with a nitrogen flow.

Table 1 gives examples of actual measurement values of the speed, holding force and contact pressure force 34 in the vertical drawing method of the invention.

TABLE 1

| | | |
|---|---|---|
| Speed draw-off unit 1 | draw-off roll 3 | 5.76 min$^{-1}$ |
| | draw-off roll 4 | 5.77 min$^{-1}$ |
| Speed draw-off unit 2 | draw-off roll 7 | 5.75 min$^{-1}$ |
| | draw-off roll 8 | 5.75 min$^{-1}$ |
| Holding force draw-off unit 1 | draw-off roll 3 | −12.34 kp |
| | draw-off roll 4 | −12.41 kp |
| Holding force draw-off unit 2 | draw-off roll 7 | −12.42 kp |
| | draw-off roll 8 | −12.43 kp |
| Contact pressure force draw-off unit 1 | | 64.5 kp |
| Contact pressure force draw-off unit 2 | | 64.1 kp |

The holding force is here a measure of the torque of the respective draw-off roll. It is evident from the measured values, which are instantaneous recordings in the drawing process, that in the method of the invention and due to the combined regulation of speed and torque (holding force) different values are obtained in the individual draw-off rolls for these parameters.

The invention claimed is:
1. A method for producing a cylindrical glass body in a vertical drawing process, said method comprising:
a method step in which a glass blank is supplied to a heating zone, and softened therein zonewise, and a glass strand is drawn off using a draw-off device at a controlled drawing speed from the softened area,
said draw-off device comprising a first draw-off unit having rolling bodies rolling on said glass strand and being distributed around the circumference thereof,
said rolling bodies of said draw-off device including a reference rolling body and at least one auxiliary rolling body,
said reference rolling body and said auxiliary rolling body or bodies each having a respective varying torque acting thereon dependent on a variable weight of the drawn-off glass strand, the drawing speed being controlled by setting a speed of said reference rolling body,
said draw-off device further comprising at least one additional draw-off unit including a plurality of additional rolling bodies each rolling on the glass strand,
wherein a value correlated to the torque acting on said reference rolling body is determined and the determined value is used as a setpoint torque based on which the torque acting on said at least one auxiliary rolling body and the torques acting on said additional rolling bodies of said at least one additional draw-off unit are adjusted so as to equalize the torque acting on said reference rolling body and the torques acting on said at least one auxiliary rolling body and said additional rolling bodies and so that all of the rolling bodies exert the same forces on the glass strand, and
wherein said value is determined repeatedly or continuously, and the setpoint torque is a variable setpoint torque used to repeatedly or continuously adjust the torques of said at least one auxiliary rolling body and said additional rolling bodies as the glass strand depending therefrom changes in weight as the cylindrical glass body is drawn.

2. The method according to claim 1, wherein said torque in said at least one auxiliary rolling body is set to said setpoint torque.

3. The method according to claim 1, wherein said additional rolling bodies of said at least one additional draw-off unit are movable in a direction perpendicular to a longitudinal axis of said glass strand.

4. The method according to claim 1, wherein said reference and auxiliary rolling bodies are pressed with an adjustable contact pressure force against said glass strand.

5. The method according to claim 4, wherein said contact pressure force is set dependent upon the weight of the drawn-off glass strand.

6. The method according to claim 5, wherein said contact pressure force is controlled by structure that comprises a damping member.

7. The method according to claim 4, wherein said reference rolling body, said at least one auxiliary rolling body, and said additional rolling bodies have a roll surface having a coefficient of friction in the range of from 0.2 to 0.5.

8. The method according to claim 7, wherein said roll surface contains asbestos, asbestos substitutes or SiC.

9. The method according to claim 1, wherein said reference rolling body, said at least one auxiliary rolling body, and said additional rolling bodies are pressed with an adjustable contact pressure force against said glass strand; and wherein, when a predetermined maximum contact pressure force is exceeded in said rolling bodies of said first draw-off unit, said rolling bodies of said second draw-off unit are additionally brought into engagement with said glass strand, or said contact pressure force is increased in the rolling bodies of said second draw-off unit that are in engagement with said glass strand.

10. The method according to claim 9, wherein said reference rolling body, said at least one auxiliary rolling body, and said additional rolling bodies have a roll surface having a coefficient of friction in the range of from 0.2 to 0.5.

11. The method according to claim 10, wherein said roll surface contains asbestos, asbestos substitutes or SiC.

12. The method according to claim 1, wherein the reference and the at auxiliary rolling bodies have a roll surface having a coefficient of friction in the range of from 0.2 to 0.5.

13. The method according to claim 12, wherein said roll surface contains asbestos, asbestos substitutes or SiC.

14. The method according to claim 1, wherein said reference rolling body said at least one auxiliary rolling body, and said additional rolling bodies have a roll surface having a coefficient of friction in the range of from 0.2 to 0.5.

15. The method according to claim 14, wherein said roll surface contains asbestos, asbestos substitutes or SiC.

16. A method for producing a cylindrical glass body in a vertical drawing process, said method comprising:
supplying a glass blank to a heating zone, and softening the glass blank therein;
drawing off a glass strand using a draw-off device at a controlled drawing speed from the softened area, said draw-off device comprising a first draw-off unit comprising a reference rolling body and an auxiliary rolling body, said reference rolling body and said auxiliary rolling body both engaging the glass strand at a fixed horizontal position and further comprising at least one additional draw-off unit including a plurality of additional rolling bodies engaging the glass strand at a second fixed horizontal position, said reference rolling body, said auxiliary body, and said additional rolling bodies each having a respective speed controlling device operatively associated therewith, wherein an input N corresponding to a setpoint drawing speed is supplied to the speed controller of the reference rolling body;

determining, using a sensor connected with the reference rolling body, a reference torque value of torque being applied to said reference rolling body by the strand as it is drawn;

determining a plurality of additional torque values using sensors connected with the auxiliary rolling body and the additional rolling bodies, each torque value being correlated to a respective of torque being applied to one of the additional rolling bodies or the auxiliary rolling body;

determining a plurality of correction signals K each by a comparison of the reference torque value to a respective one of the auxiliary rolling body torque value or the additional torque values;

supplying the input N and each of the correction signals K to the speed controlling device of the associated auxiliary or additional rolling body such that the torques acting on the auxiliary rolling body and the additional rolling bodies are adjusted based on said corrective signals K so as to equalize the torque acting on said reference rolling body, the torque acting on said auxiliary rolling body, and the torque acting on said additional rolling bodies, and so that all of the rolling bodies exert the same forces on the glass strand, with the reference rolling body torque value as a variable setpoint torque for the torques acting on the auxiliary rolling body and said additional rolling bodies;

wherein correction signals K are determined and the torques acting on the auxiliary rolling body and the additional rolling bodies are adjusted based on correction signals K repeatedly or continuously.

* * * * *